United States Patent
Orjela

[11] Patent Number: 6,059,951
[45] Date of Patent: May 9, 2000

[54] PROCESS FOR MANUFACTURING SURFACE-TREATED WIRE FOR USE IN COMPOSITE ELEMENTS OF ELASTOMERIC MATERIAL

[75] Inventor: Gurdev Orjela, Gavirate, Italy

[73] Assignee: Pirelli Coordinamento Pneumatici SpA, Milan, Italy

[21] Appl. No.: 08/962,317

[22] Filed: Oct. 31, 1997

Related U.S. Application Data

[62] Division of application No. 08/393,473, Feb. 24, 1995, Pat. No. 5,722,039.

[30] Foreign Application Priority Data

Feb. 24, 1994 [IT] Italy .................................. M194A0335

[51] Int. Cl.[7] ................................ C25D 3/56; C25D 7/06
[52] U.S. Cl. .......................... 205/141; 156/151; 205/222; 205/245
[58] Field of Search ................................... 205/141, 155, 205/222, 245; 156/151, 910

[56] References Cited

U.S. PATENT DOCUMENTS

| | | | |
|---|---|---|---|
| 2,296,838 | 9/1942 | Domm | 428/625 |
| 4,218,517 | 8/1980 | Van Ooij | 428/614 |
| 4,258,770 | 3/1981 | Davis et al. | 152/330 R |
| 4,265,678 | 5/1981 | Hachisuka et al. | 148/517 |
| 4,545,416 | 10/1985 | Itoh et al. | 152/539 |
| 4,859,289 | 8/1989 | Nishimura et al. | 204/28 |
| 4,872,932 | 10/1989 | Yoshikawa et al. | 156/151 |
| 4,911,991 | 3/1990 | Van Ooij | 428/625 |
| 4,929,512 | 5/1990 | Nishimura et al. | 428/625 |
| 4,978,586 | 12/1990 | Chambaere et al. | 428/625 |
| 5,221,559 | 6/1993 | Martigny et al. | 427/419.5 |
| 5,284,896 | 2/1994 | Shimada et al. | 524/435 |
| 5,338,620 | 8/1994 | Van Ooij et al. | 428/625 |

FOREIGN PATENT DOCUMENTS

| | | |
|---|---|---|
| 0157716 | 10/1985 | European Pat. Off. . |
| 269036 | 6/1988 | European Pat. Off. . |
| 0283738 | 9/1988 | European Pat. Off. . |
| 0296036 | 12/1988 | European Pat. Off. . |
| 0383150 | 8/1990 | European Pat. Off. . |
| 0536545 | 4/1993 | European Pat. Off. . |
| 2413228 | 7/1979 | France . |
| 2426562 | 12/1979 | France . |
| 2856325 | 7/1979 | Germany . |
| 54-89939 | 7/1979 | Japan . |
| 62-201936 | 9/1987 | Japan . |
| 63-288742 | 11/1988 | Japan . |
| 63-303055 | 12/1988 | Japan . |
| 1177390 | 7/1989 | Japan . |

OTHER PUBLICATIONS

Abner Brenner, *Electrodeposition of Alloys, Principles and Practice*, Academic Press, New York, vol. II, pp. 194–228, 1963 (Month Not Available).

F. A. Lowenheim, *Electroplating*, McGraw–Hill Book Co., New York, pp. 410–415, 1978*.

Surface Coating Technology, vol. 52, No. 1, Mar. 12, 1993, Switzerland, pp. 17–30, Giridhar et al. 'Study of Zn–Ni and Zn–Co Coatings Electrodeposited on Steel Strips'.

*Primary Examiner*—Kathryn Gorgos
*Assistant Examiner*—William T. Leader
*Attorney, Agent, or Firm*—Stevens, Davis, Miller & Mosher, LLP

[57] ABSTRACT

A wire, generally made of steel and used to make composite elements of elastomeric material, is submitted to an electrodeposition process in an electrolytic bath for being coated with a zinc/cobalt alloy in which the average cobalt content is lower than 1%. In the coating thickness made of the zinc/cobalt alloy, different cobalt concentrations exist, that is a 1% to 3% concentration at the area close to the metal wire and a concentration as low as 0.5% maximum at the overlying area. Adhesion promoters for example consisting of cobalt neodecanate, added to the elastomeric material, promote the adhesion of said elastomeric material to the wire.

26 Claims, No Drawings

PROCESS FOR MANUFACTURING SURFACE-TREATED WIRE FOR USE IN COMPOSITE ELEMENTS OF ELASTOMERIC MATERIAL

This is a division of application Ser. No. 08/393,473, filed Feb. 24, 1995, now U.S. Pat. No. 5,722,039.

BACKGROUND OF THE INVENTION

The present invention relates to a wire, generally a steel wire, provided with a surface coating of a metal alloy. The invention also relates to a process put into practice for carrying out surface-treating of the wire in question and a composite element obtained by incorporating wires made in accordance with the present invention into an elastomeric matrix.

It is known that in the manufacture of rubber articles, such as tires for motor-vehicles and the like, composite structural elements are widely used, that is elements made up of a matrix of an elastomeric material into which a plurality of wires or metallic cords each consisting of a plurality of said wires are incorporated, the function of which is to give the structural element the necessary features in terms of structural strength and geometrical stability.

The wires used for this purpose, generally steel wires, are obtained as a result of a drawing operation carried out at several different times until the desired size is reached, and usually have a coating of a metal alloy on their surface, the essential functions of said coating consisting in promoting the drawing capability of the wire and the adhesion of the elastomeric matrix to the coated wire.

To this end, different modalities for making the wire coating have been proposed.

For example, European Patent EP 296,036 deals with a wire coating made of copper, brass, tin, zinc or alloys thereof also containing nickel or cobalt for the purpose of improving adhesion of the elastomeric material to the wire.

In European Patent EP 283,738, filed in the name of the same Applicant, a wire coating is disclosed which consists of two superposed layers made of a nickel/zinc alloy wherein, in the inner layer, the zinc content is between 60% and 90% and in the outer layer the nickel content is in the range of 60% to 80%. In the same patent the possibility of replacing nickel with cobalt in the nickel/zinc alloy is suggested.

In French patents FR 2,413,228 and FR 2,426,562 a wire coated with a ternary alloy consisting of brass and cobalt is described, in which the cobalt content is between 0.5% and 30%.

In U.S. Pat. No. 2,296,838 the wire coating consists of an inner layer and an outer layer, made of zinc and cobalt respectively.

U.S. Pat. No. 4,218,517 illustrates the application to a wire of a coating made of a copper/cobalt alloy in which the copper content is in the range of 10% to 70%.

Finally, U.S. Pat. No. 4,872,932 pertains to a method of making composite elements of an elastomeric material essentially consisting of a support and a matrix of an elastomeric material fastened thereto. In this manufacturing method a film of a thickness included between 10 Å and 100 $\mu$m, made of a zinc/cobalt alloy with a cobalt content higher than 80% is provided to be deposited on said support.

SUMMARY OF THE INVENTION

In accordance with the present invention, it has been found that if the coating is carried out by electrodeposition of a zinc/cobalt alloy having a cobalt content not higher than 1%, optimal features in terms of drawing capability and corrosion strength of the wire can be simultaneously achieved, as well as an excellent adhesion of the matrix of elastomeric material to the wires, the attachment values being high even after aging of the composite element.

In particular, the invention relates to a surface treated wire, adapted to make composite elements of elastomeric material, characterized in that said surface coating consists of a zinc/cobalt alloy having a cobalt content lower than 1%.

Preferably said coating is obtained by electrodeposition of the coating layer on the wire surface, and the cobalt content in the coating layer is lower than 0.5%.

In the coating layer of the drawn wire which has a thickness between 0.1 $\mu$m and 0.6 $\mu$m two different concentration levels of the cobalt material can be distinguished and more particularly a level between 1% and 3% at the radially inner area, that is that directly in contact with the bare wire and a level lower than 0.5% in the radially outer area. The thickness of the radially inner area having a cobalt concentration gradient between 1% and 3%, is preferably in the range of 0.1 nm to 0.4 nm.

Advantageously, said steel wire has a carbon content between 0.6% and 0.9% and a diameter after drawing in the range of 0.10 mm to 0.50 mm.

Also an object of the present invention is a process for making a surface treated wire, especially adapted for use with composite elements of elastomeric material, characterized in that it comprises an immersion step of the wire into an electrolytic bath containing cobalt sulfate and zinc sulfate, in order to carry out the deposition of a zinc/cobalt alloy on the wire itself, said alloy exhibiting a cobalt content lower than 1%.

Preferably, the electrolytic bath is made up of an aqueous solution containing zinc sulfate heptahydrate in an amount between 600 and 630 g/l, cobalt sulfate heptahydrate in an amount between 100 and 110 g/l, as well as sodium sulfate in an amount between 70 and 90 g/l.

In a preferred embodiment the electrolytic bath, maintained to a temperature in the range of 25° to 35° C., is passed through by the wire being worked at a rate of 15 to 25 meter/minute and the residence time of the wire in the electrolytic bath has a duration of 5 to 15 seconds.

In an alternative embodiment the electrolytic bath, maintained at a temperature in the range of 50° to 60° C. is passed through by the wire being worked at a rate of 40 to 60 meters/minute and the residence time of the wire in the electrolytic bath has a duration of 2 to 6 seconds.

The electrolytic bath preferably has a pH between 1.5 and 2.5, at 55° C., the value of said pH being adjusted by addition of sulphuric acid.

Referring to a preferred embodiment, a cathodic current of a density between 30 and 40 amperes per square decimeter ($A/dm^2$) is applied to the wire being worked, whereas in the cited alternative embodiment a cathodic current of a density between 65 and 85 $A/dm^2$ is applied to said wire.

The process further comprises at least one drawing step carried out on the wire provided with the coating layer made up of a zinc/cobalt metal alloy, the wire diameter being of a value between 1.2 mm and 1.6 mm before drawing and of a value between 0.10 mm and 0.50 mm after drawing.

After drawing the thickness of the coating layer is in the range of 0.1 $\mu$m to 0.6 $\mu$m.

A further object of the present invention is a composite element comprising a matrix of an elastomeric material and reinforcing steel wires or cords provided with a metal alloy coating, characterized in that the wire coating consists of a zinc/cobalt alloy wherein the cobalt content is lower than 1%, adhesion promoters being added to the elastomeric material forming said matrix in order to promote adhesion of same to said reinforcing wires.

Advantageously said adhesion promoters comprise cobalt neodecanate.

Further features and advantages will become more apparent from the following detailed description, given for illustration purposes only, of a preferred embodiment of a surface-treated wire to produce composite elements of elastomeric material and the process for manufacturing said wire, in accordance with the present invention.

DESCRIPTION OF A PREFERRED EMBODIMENT

In the following description reference will be made to the enclosed table reproducing the results of comparison tests carried out on wires and cords made in accordance with the present invention and on other wires and relevant cords made according to the known art.

The wire of the present invention is made of steel, preferably of the high tensile type, having a carbon content in the range of 0.6% to 0.9%, and it is provided with a surface coating of a metal alloy having a dual function: that of preventing corrosion of the wire and that of promoting adhesion to a matrix of elastomeric material into which the wire will be incorporated, in order to form a composite-material structural element to be used for example in making structural components for tires and the like.

Since the surface-treated wire is to be submitted to drawing operations, it is also indispensable for the coating to give the wire optimal features in terms of drawing capability.

In accordance with the present invention, in a novel manner it in provided that the above surface coating should consist of a zinc/cobalt alloy with a cobalt content not higher than 1% and preferably not higher than 0.5%.

Still in accordance with the invention, said coating is formed by an electrodeposition process in which said alloy is deposited on the wire surface. More particularly, in the process for the manufacture of said surface-coated wire, the wire continuously fed from a reel, is submitted, upon an optional pickling step in sulphuric acid, to an electrolytic bath containing cobalt sulphate and zinc sulphate, in order to achieve the zinc/cobalt alloy deposition on the wire surface.

Preferably, such an electrolytic bath is made up of an aqueous solution containing zinc sulphate heptahydrate to an amount between 600 and 630 g/l, cobalt sulphate heptahydrate to an amount between 100 and 110 g/l, as well as sodium sulphate to an amount between 70 and 80 g/l. Preferably, the pH of the electrolytic bath at a temperature of 55° C. has a value between 1.5 and 2.5. More particularly, the electrolytic bath acidity is preferably adjusted by means of a concentration of $H_2SO_4$, so as to maintain the predetermined pH value at the predetermined temperature.

The temperature of the electrolytic bath, density of the cathodic current applied to the wire being worked and longitudinal feeding rate of the wire (and consequently the residence time of the wire in the electrolytic bath) have values the adjustments of which depend on each other, for the purpose of accomplishing the zinc/cobalt alloy deposition according to the desired modalities.

In accordance with a preferred embodiment, the electrolytic bath is maintained at a temperature between 25° C. and 35° C. and the metal wire being worked runs through the electrolytic bath at a rate in the range of 15 to 25 m/min, the residence time of the wire in the bath being between 5 and 15 seconds.

In such a preferred embodiment, the density of the cathodic current applied to the wire is between 30 and 40 $Å/dm^2$.

The main parameters relating to the accomplishment of the electrodeposition process according to a preferred exemplary embodiment of the invention, given just as an indication, are reproduced hereinafter:

overall volume of the electrolytic bath: 290 l

- bath composition: $(ZnSO)_4 \times 7H_2O = 615$ g/l $CoSO_4 \times 7H_2O = 105$ g/l $Na_2SO_4 = 75$ g/l temperature of the electrolytic bath=30° C.

density of the cathodic current=34 $Å/dm^2$ feed rate of the wire=18 m/min residence time of the wire in the electrolytic bath=10 seconds.

In accordance with an alternative embodiment, the electrolytic bath is maintained to a temperature in the range of 50° C. to 60° C., and the wire being worked runs through the electrolytic bath at a rate of 40 to 60 m/min, the residence time of the wire in the electrolytic bath being between 2 and 6 seconds.

In the alternative embodiment, the density value of the cathodic current applied to the wire is between 65 and 85 $Å/dm^2$.

Still by way of example, the fundamental parameters of such a possible alternative version of the process of the invention are also reproduced hereinafter:

overall volume of the bath: 290 l

- bath composition: $(ZnSO)_4 \times 7H_2O = 620$ g/l $CoSO_4 \times 7H_2O = 125$ g/l $Na_2SO_4 = 75$ g/l temperature of the electrolytic bath=55° C.

density of the cathodic current=75 $Å/dm^2$ feed rate of the wire=50 m/min residence time of the wire in the electrolytic bath=5 seconds.

In accordance with the present invention, it has been found that the electrodeposition process carried out according to the above description gives rise to a cobalt concentration at the areas closer to the bare wire surface. In the thickness of the coating layer formed as a result of the electrodeposition on the wire not yet drawn, which in a preferred embodiment has a value in the range of 1 µm to 6 µm, two cobalt concentration gradients are defined: in the radially innermost area, in contact with the bare wire, having a thickness between 0.1 nm and 0.4 nm, the cobalt content is in the range of 1% to 3, whereas in the overlying area, the radially outermost one, the cobalt content is in the order of 0.4% and at all events lower than 0.5%.

Still in accordance with the present process, the wire first having a diameter between 1.2 mm and 1.6 mm is submitted after formation of the coating layer, to a drawing step following which the coated wire diameter is brought to a value between 0.10 mm and 0.50 mm. In addition, as a result of drawing, the thickness of the coating layer is brought from the starting value between 1 μm and 6 μm, to a final value between 0.1 μm and 0.6 μm.

After the foregoing it will be apparent that the wire made in accordance with the present invention exhibits excellent qualities in terms of drawing capability, by virtue of the low cobalt concentration present in the coating layer, and in particular at the peripheral areas of said layer which are mostly concerned with the phenomena of surface friction and wear due to the passage of same through the drawing machines. In this connection it is to be pointed out that, as can be seen in the phase diagram of zinc/cobalt binary alloys (Hansen and Anderko 1958), for cobalt contents lower than 1%, and preferably lower than 0.5%, a good drawing capability of the wire can be achieved because the coating layer alloy only has the η phase which is stable for cobalt contents up to 0.5%. On the contrary, cobalt contents higher than 1% will give rise to the Y phase exhibiting a high hardness and therefore low-quality features in terms of drawing capability.

Therefore, the wire obtained in accordance with the present invention is free from all the problems usually found in wires coated, according to the known art, with a double nickel/cobalt or cobalt/zinc layer and, more generally, in wires coated with zinc/cobalt alloys in which the cobalt content is greater than 1%.

In addition, the wire of the invention exhibits surprising qualities of corrosion resistant strength, in spite of the low cobalt content present in the coating layer.

It will be noted in fact that the greater cobalt concentration at the area immediately close to the bare wire surface obtained by the specific electrodeposition process gives rise to a greatly higher corrosion resistant strength than usually expected, taking into account the low cobalt content present on an average in the metal alloy constituting the coating layer as a whole.

In conclusion, a remarkable corrosion resistant strength in achieved, comparable to that of the wires coated with metal alloys having a cobalt content well above 1%, thus eliminating all drawbacks present in wires coated with brass or copper alloys which have a low corrosion resistant strength due to the degradation of the steel/coating layer interface produced by galvanic currents.

In addition, the wire of the present invention surprisingly promotes good rubber/metal attachment quality to the ends of making composite materials by insertion of wires or reinforcing metal cords made in accordance with the invention in an elastomeric matrix.

It will be recognized that, in accordance with another feature of the invention, the rubber/metal attachment quality can be considerably improved if appropriate trivalent or pentavalent adhesion promoters are added to the elastomeric matrix, such as the cobalt neodecanate.

Thus all problems typically found when wires coated with brass or copper alloys are used, are eliminated, which alloys give rise to a great decay of the rubber/metal attachment value due to the copper ion migration in the elastomeric matrix.

The table below emphasizes the drawing capability, rubber/metal adhesion and corrosion resistant strength features exhibited by the wires and cords of the invention as compared with those of other wires and cords made in accordance with the known art, taking the features of a conventional brass-coated wire as the touchstone.

For a better comprehension, it is pointed out that in said table the features found with reference to the brass-coated wires and cords have been allocated a value of 100.

First of all, with reference to the drawing capability features, the annexed table highlights that well-known wires coated with a zinc/cobalt alloy in which the cobalt content is in the order of 4% and those coated with a double Zn/Co or Zn/Ni layer respectively have a coating loss percentage (column A) four times and twice that of the brass-coated wires, by "loss percentage" meaning the percent amount of material by weight which is taken away from the coating layer as a result of drawing. In the wire made according to the present invention, the loss percentage substantially corresponds to that of the brass-coated wires.

Still with reference to the drawing capability, it will be noted that the number of wire breakages by amount of drawn wire (column B) occurring on the zinc-cobalt coated wires having a cobalt content of 4% and the zinc/cobalt or zinc/nickel double layered wires was respectively in the order of three times and twice that occurred in brass-coated wires, the drawing conditions being equal.

On the contrary, the wire made in accordance with the present invention exhibits about the same number of breakages as the brass-coated wire.

As regards the adhesion quality, it is pointed out that it has been tested by evaluating the force necessary for extracting a cord length of the 1×4×0.25 type (four wires with a diameter of 0.25 mm twisted together) from a sample blend in which said cord is incorporated (a test done according to ASTM D-2229 standard).

Such a test has been carried out both on samples directly coming from the vulcanization step of the composite material (column C) and on samples previously submitted to an aging process (Column D), consisting in keeping the samples 8 days in a climatic chamber having a humidity content of 90%, and a temperature of 65° C., according to the above mentioned ASTM standard.

The test enables the qualitative degradation to adhesion resulting from natural aging of the tires in use to be evaluated.

Due to the very bad drawing capability of the wires having a cobalt content equal to 4%, it has been impossible to make wires thin enough to enable their use for producing cords designed to carry out comparative tests relating to adhesion resistance and corrosion resistant strength within the composite element.

As can be seen, the cord formed of wires coated with a double zinc/cobalt or zinc/nickel layer shows, immediately after vulcanization, a lower attachment level than a cord formed of brass-coated wires. However the attachment level offered by this type of known wires keeps almost constant over time, so that, after aging, it has the same value as that offered by cords formed of brass-coated wires, as said cords undergo a qualitative decay as a result of said aging. The wires manufactured according to the present invention exhibit attachment levels similar to those of the cords having brass-coated wires, both after the vulcanization step and after said aging.

As regards the corrosion resistant strength (Column E), as measured by evaluating the rust amount present on a treated wire in a salty environment according to ASTM-B117/73 standard, it is possible to find that both wires made according to the invention and wires coated with a zinc/cobalt or zinc/nickel double layer show a strength 50 times higher than that of the brass-coated wires.

The corrosion strength has been also evaluated on a series of four motor-vehicle tires, size 180/60R14, by machine tests and not by road tests, measuring the corrosion spreading in time.

More particularly, each tire provided with a belt comprising a pair of strips of rubberized fabric reinforced with said cords type 1×4×0.25, has been rotated on a roller test bench at a speed of 80 km/h for a period of time of 100 hours (Column F) and 200 hours (Column G).

At the equatorial plane of the tire six holes with a diameter of 1 mm have been produced, said holes extending from the radially inner surface of the tread to the area between the two belt strips; then a saline solution containing 125 g of salt (NaCl) in half a liter of water has been introduced into the tire.

At the end of the test the tread has been taken away from the tire and the qualitative evaluation of the rubberizing state of the belt cords has been carried out.

The presence of bare cords, that is devoid of rubber, has been ascribed to the rubber/metal bond decay due to the migration of the saline solution along the cord.

In the table below one can see that the corrosion resistant strength in the cords having wires according to the invention is 30 times higher than that of the cords having brass-coated wires after a 100 hour test, and becomes 50 times higher after a 200 hour test, thanks to a lower propagation velocity of the corrosion.

Obviously, many modifications and variations may be made to the invention as conceived, all of them falling within the scope of the claims hereinafter.

TABLE

| Wire Coating | Wire drawing capability | | Rubber/Metal Attachment Level | | Corrosion on a wire | strength in a tire | |
|---|---|---|---|---|---|---|---|
| | A | B | C | D | E | F | G |
| Brass | 100 | 100 | 100 | 100 | 100 | 100 | 100 |
| Zn/Co _ 4% | 400 | 300 | = | = | = | = | = |
| Zn/Co—Zn/Ni | 200 | 200 | 80 | 100 | 5000 | = | = |
| Zn/Co < 1% | 100 | 100 | 100 | 100 | 5000 | 3000 | 5000 |

I claim:

1. A process for making a surface-treated steel wire, adapted for use in composite elements of elastomeric material, comprising the steps of:
   immersing the wire in an electrolytic bath containing cobalt sulfate and zinc sulfate, for carrying out a deposition of a zinc/cobalt alloy on the outer surface of the treated wire, said alloy having a cobalt content effective to promote adhesion, said alloy having an overall cobalt content lower than 1% and said alloy having an absence of copper,
   wherein said deposition is an electrodeposition in which a cathodic current is applied to the wire during said immersing step to provide said wire with an outermost surface coating layer,
   in which in said surface coating layer the cobalt is distributed in an uneven manner in two different concentration levels, with a first level between 1% and 3% at a radially inner area directly in contact with the steel wire and a second level lower than 0.5% in a radially outer area overlying the first level.

2. A process according to claim 1 in which the thickness of the radially inner area having a cobalt concentration gradient between 1% and 3%, is in the range of 0.1 nm to 0.4 nm.

3. A process according to claim 1, wherein said electrolytic bath consists essentially of cobalt sulfate, zinc sulfate and sodium sulfate.

4. A process for making a surface-treated steel wire, adapted for use in composite elements of elastomeric material, comprising the steps of:
   immersing the wire in an electrolytic bath containing cobalt sulfate and zinc sulfate, for carrying out a deposition of a zinc/cobalt binary alloy on the outer surface of the treated wire, said binary alloy having a cobalt content effective to promote adhesion, said binary alloy having an overall cobalt content lower than 1%, and said binary alloy having an absence of copper,
   wherein said deposition is an electrodeposition in which a cathodic current is applied to the wire during said immersing step to provide said wire with a surface coating layer.

5. A process according to claim 4 in which the electrolytic bath is made up of an aqueous solution containing zinc sulfate heptahydrate in an amount between 600 and 630 g/l, cobalt sulfate heptahydrate in an amount between 100 and 110 g/l, as well as sodium sulfate in an amount between 70 and 80 g/l.

6. A process according to claim 5 including maintaining the electrolytic bath at a temperature in the range of 25° to 35° C. and passing the wire therethrough at a rate of 15 to 25 meters/minute, the residence time of the wire in the electrolytic bath having a duration of 5 to 15 seconds.

7. A process according to claim 6 including applying a cathodic current of a density between 30 and 40 A/dm$^2$ to the wire being worked.

8. A process according to claim 5 including maintaining the electrolytic bath at a temperature in the range of 50° to 60° C. and passing the wire therethrough at a rate of 40 to 60 meters/minute, the residence time of the wire in the electrolytic bath having a duration of 2 to 6 seconds.

9. A process according to claim 8 including applying a cathodic current of a density between 65 and 85 A/dm$^2$ to the wire being worked.

10. A process according to claim 5 including maintaining the electrolytic bath at a pH between 1.5 and 2.5, at 55° C., the value of said pH being adjusted by addition of sulphuric acid.

11. A process according to claim 4 in which the thickness of the coating layer present on the wire after the immersion step in the electrolytic bath is between 1 μm and 6 μm.

12. A process according to claim 4 including carrying out at least one drawing step on the wire provided with the coating layer made up of a zinc/cobalt alloy.

13. A process according to claim 12 in which the wire diameter before drawing has a value between 1.2 mm and 1.6 mm and, after drawing, a value between 0.10 and 0.50 mm.

14. A process according to claim 13 in which after drawing, the thickness of the coating layer is between 0.1 μm and 0.6 μm.

15. A process according to claim 4, wherein the cobalt content in the coating layer is lower than 0.5%.

16. A process according to claim 4, wherein the cobalt concentration of the alloy increases at regions of the coating closer to the bare wire surface.

17. A process according to claim 4 wherein, the content of cobalt in a radially inner area of said coating directly in contact with the metal wire being between 1% and 3%, and the content of cobalt in a radially outer area overlaying said radially inner area being an effective amount to affect the adhesion of said elastomeric material but lower than 0.5%.

18. A process according to claim 4, wherein the electrolytic bath is made up of an aqueous solution containing zinc sulfate heptahydrate in an amount between 600 and 630 g/l, cobalt sulfate heptahydrate in an amount between 100 and 110 g/l, as well as sodium sulfate in an amount between 70 and 80 g/l;

the electrolytic bath is maintained at a temperature in the range of 25° to 35° C. and passing the wire therethrough at a rate of 15 to 25 meters/minute, the residence time of the wire in the electrolytic bath having a duration of 5 to 15 seconds;

the pH of the electrolytic bath is maintained at between 1.5 and 2.5 at 55° C., the value of the pH being adjusted by addition of sulphuric acid; and a cathodic current density between 30 and 40 A/dm$^2$ is applied to the wire being worked.

19. A process according to claim 4, wherein the electrolytic bath is made up of an aqueous solution containing zinc sulfate heptahydrate in an amount between 600 and 630 g/l, cobalt sulfate heptahydrate in an amount between 100 and 110 g/l, as well as sodium sulfate in an amount between 70 and 80 g/l;

the electrolytic bath is maintained at a temperature in the range of 50° to 60° C. and passing the wire therethrough at a rate of 40 to 60 meters/minute, the residence time of the wire in the electrolytic bath having a duration of 2 to 6 seconds;

the pH of the electrolytic bath is maintained at between 1.5 and 2.5 at 55° C., the value of the pH being adjusted by addition of sulphuric acid; and a cathodic current density between 65 and 85 A/dm$^2$ is applied to the wire being worked.

20. A process according to claim 4 in which the steel wire has a carbon content between 0.6% and 0.9%.

21. A process according to claim 4, further comprising drawing the coated wire wherein the outermost coating of said drawn wire is said surface coating layer.

22. A process according to claim 21, further comprising reinforcing an elastomeric material with a member of the group consisting of said drawn wire and cords of said drawn wire.

23. A process for making a surface-treated steel wire, adapted for use in a composite element of elastomeric material, comprising the steps of:

i) immersing the wire in an electrolytic bath containing cobalt sulfate and zinc sulfate, for carrying out a deposition of a zinc/cobalt alloy on the outer surface of the treated wire, said alloy having a cobalt content effective to promote adhesion, said alloy having an overall cobalt content lower than 1%, and said alloy having an absence of copper, wherein said deposition is an electrodeposition in which a cathodic current is applied to the wire during said immersing step to provide a surface coating layer of said alloy on the wire, ii) drawing said surface-coated wire; and iii) reinforcing the elastomeric material with a member of the group consisting of said drawn surface-coated wire and cords of said drawn surface-coated wire, wherein said surface coating consists of said zinc/cobalt alloy, and wherein the composite element contains adhesion promoters.

24. A process according to claim 23, wherein said adhesion promoters comprise cobalt neodecanate.

25. A process according to claim 23, in which in said surface coating layer the cobalt is distributed in an uneven manner in two different concentration levels, with a first level between 1% and 3% at a radially inner area directly in contact with the steel wire and a second level lower than 0.5% in a radially outer area overlying the first level.

26. A process according to claim 23, wherein said surface coating layer has a thickness between 0.1 μm and 0.6 μm.

* * * * *